United States Patent [19]

Moseley

[11] 4,384,814

[45] * May 24, 1983

[54] APPARATUS FOR STACKING LUMBER

[76] Inventor: Kemper N. Moseley, 1007 Gloria Ave., Durham, N.C. 27701

[*] Notice: The portion of the term of this patent subsequent to Jan. 12, 1998, has been disclaimed.

[21] Appl. No.: 230,388

[22] Filed: Feb. 2, 1981

Related U.S. Application Data

[63] Continuation-in-part of Ser. No. 79,473, Sep. 27, 1979, Pat. No. 4,310,274.

[51] Int. Cl.³ .............................................. B65G 57/18
[52] U.S. Cl. ........................................ 414/42; 414/57; 414/88
[58] Field of Search ...................... 414/42, 57, 68, 77, 414/83, 84, 87, 88, 89, 91; 198/425, 435, 459, 859

[56] References Cited

U.S. PATENT DOCUMENTS

| | | | |
|---|---|---|---|
| 1,128,671 | 2/1915 | Evans | 414/88 X |
| 1,225,523 | 5/1917 | Surles | 414/42 |
| 2,658,630 | 11/1953 | Melin | 414/57 |
| 2,686,603 | 8/1954 | Lawson | 414/83 X |
| 2,878,947 | 3/1959 | Thrasher | 414/84 X |
| 2,928,559 | 3/1960 | Mosely | 414/42 X |
| 3,393,812 | 7/1968 | Mayo et al. | 414/84 |
| 3,456,775 | 7/1969 | Stubbins et al. | 198/425 X |
| 3,904,047 | 9/1975 | Lunden | 414/42 |
| 4,310,274 | 1/1982 | Moseley | 414/42 |

FOREIGN PATENT DOCUMENTS

| | | | |
|---|---|---|---|
| 141624 | 8/1953 | Sweden | 414/42 |
| 7802413 | 10/1979 | Sweden | 414/83 |
| 1020205 | 2/1966 | United Kingdom | 414/88 |
| 599969 | 3/1978 | U.S.S.R. | 414/42 |

Primary Examiner—Leslie J. Paperner
Attorney, Agent, or Firm—B. B. Olive

[57] ABSTRACT

A push-on type lumber stacker utilizes a pivotal conveyor for receiving boards from a bulk supply and discharging complete courses of boards onto a lumber stack. The discharge end of the conveyor pivots upwardly in correspondence with the increasing height of the stack. The pivotal conveyor incorporates a plurality of automatically actuated stick holders which hold the stacking sticks as runners during formation of each course and then release the sticks to serve as course spacers in the stack. A plurality of chain-mounted discs on the conveyor assist in pushing the boards onto the stacking sticks and, in conjunction with other auxiliary apparatus, enable one course of boards to be built up on the conveyor while another course is held ready for discharge.

3 Claims, 7 Drawing Figures

4,384,814

APPARATUS FOR STACKING LUMBER

CROSS REFERENCE TO RELATED APPLICATION

This application is a continuation in part of copending application Ser. No. 079,473, filed Sept. 27, 1979, entitled "Lumber Stacker and Method", now U.S. Pat. No. 4,310,274.

DESCRIPTION

1. Technical Field

The invention relates to apparatus for stacking lumber.

2. Background Art

A useful history of the prior art can be found in applicant's prior U.S. Pat. Nos. 3,204,753 and 4,054,211 and in applicant's copending application Ser. No. 079,473, now U.S. Pat. No. 4,310,274, the contents of which are incorporated herein by reference.

It has been found desirable to provide an improved remotely operable stacking conveyor having the facility to hold one course of lumber ready for discharge while building up another course on the conveyor in order to substantially reduce the time required to build a stack and to give the operator the ability to build up a reserve course or courses at appropriate times during the stacking operation.

Disclosure of Invention

According to the apparatus of the present invention, a lumber stack is formed on a base by means of an improved remotely operable pivotal conveyor mounting automatically actuated stick holders. Boards are fed to the pivotal conveyor from a bulk supply. The arms of the pivotal conveyor mount chains which in turn support spaced apart disc devices that act as means for pushing the boards off the discharge end of the conveyor onto sticks held by the stick holders. The sticks act as runners upon which each new course of lumber is formed. A feature of the invention resides in auxiliary apparatus which enables a reserve course of lumber to be built up on the pivotal conveyor while a primary course of lumber is positioned for discharge, thereby substantially reducing the time required to build a stack.

BEST MODE FOR CARRYING OUT THE INVENTION

Figure 1:
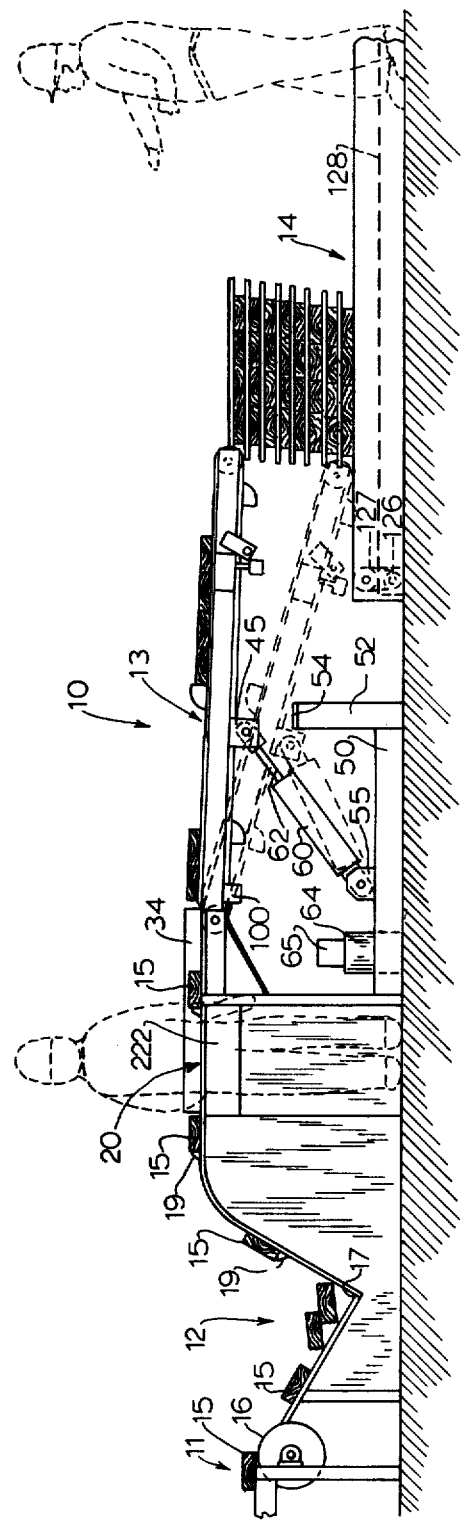
FIG. 1 is a side elevation view of a lumber stacking system incorporating the lumber stacker of the invention with the pivotal conveyor thereof being illustrated in solid lines in a raised position and in dashed lines approximately 2 to 3 course heights above its lowermost position.

Referring to the drawings, and in particular to FIG. 1, the lumber stacking system 10 associated with the present invention comprises a lumber deck 11; an unscrambler 12; a pivotal, course-forming, stacker arm assembly 13; and a lumber stacker base 14. Lumber deck 11 and unscrambler 12 are of the type disclosed in applicant's previously mentioned U.S. Pat. Nos. 3,204,753 and 4,054,211 and as further disclosed in copending application Ser. No. 079,473 now U.S. Pat. No. 4,310,274. Lumber stacker base 14 used with the present invention is also of the type disclosed in applicant's copending application Ser. No. 079,473 now U.S. Pat. No. 4,310,274. Therefore the details of lumber deck 11, unscrambler 12 and lumber stacker base 14 will only be dealt with as necessary to gain an appreciation of the present invention which is primarily related to the improved pivotal stacker arm assembly 13 and associated stick holders.

According to a well-known operation, a bulk supply of boards 15 is placed on deck 11 and moved therealong until boards 15 are discharged from the end of deck 11 where they move over a sprocket 16 and fall by gravity into the V-shaped portion 17 of unscrambler 12. A series of parallel chains 18, each having upwardly extending spaced lugs 19, pass under boards 15 and remove boards 15 from V-shaped portion 17. Each lug 19 will typically remove one board during each pass; however, sometimes a lug will remove more than one board or no board at all. The removed boards 15 are then transferred upwardly onto a second horizontal deck 20 where they are conveyed in a direction transverse to their longitudinal axes by chains 18 and lugs 19 and are discharged from deck 20 at the deck terminal edge portion 21, i.e., at the line connecting the upper surfaces of drive sprockets 26 as best seen in FIG. 2.

Chains 18 are driven by a drive sprocket 22 fixedly mounted on a horizontal drive shaft 23 which is, in turn, driven by a hydraulic motor 12M through chain 25. Sprockets 26 are fixedly secured to shaft 23 and thereby provide synchronized drive to chains 18.

Figure 2:
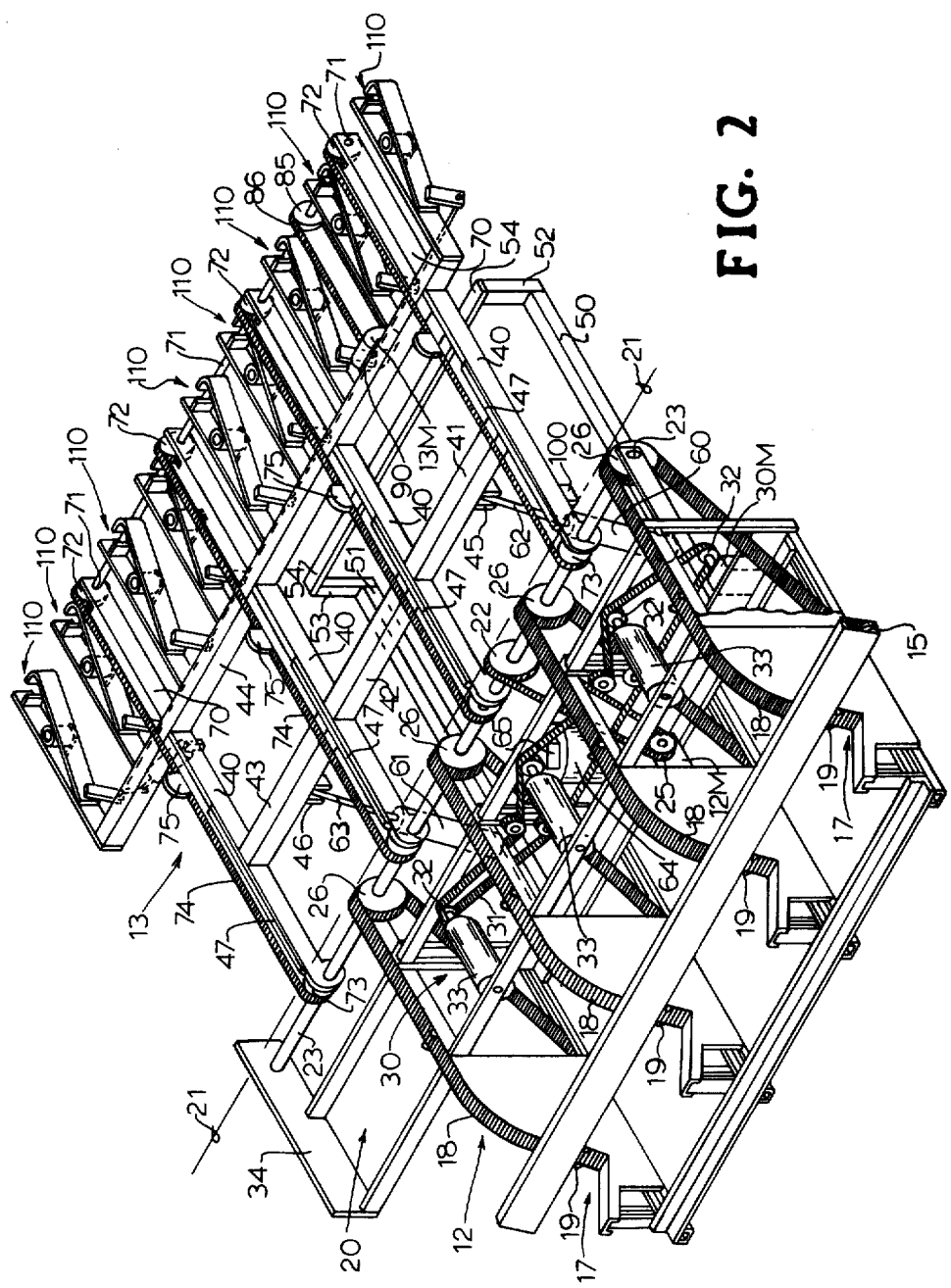
FIG. 2 is a pictorial view of a portion of the system incorporating the pivotal, course forming, stacker arm assembly and stick holders. A portion of the cover has been removed for illustrative purposes.

Referring to FIG. 2, an evenender mechanism 30 includes a drive chain 31 and sprockets 32 which drive evenend rollers 33 so that boards 15 are moved toward a wall 34 until they abut the wall as they move along on chains 18 toward deck terminal end portion 21. Regardless of the lengths of boards 15, it is desired that one end of the boards 15 always be maintained straight. A drive motor 30M powers chain 31 for driving sprockets 32.

Figure 7:
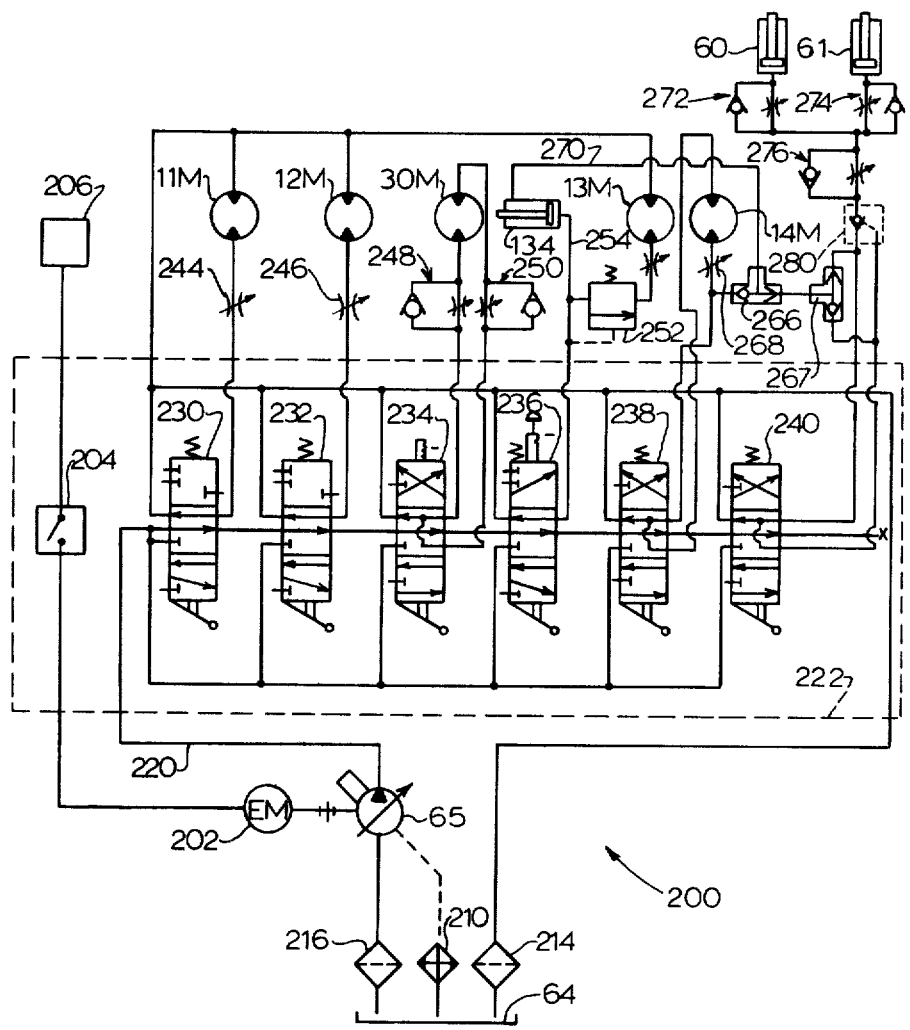
FIG. 7 is a schematic representation of the electric and hydraulic circuitry employed for driving the apparatus.

Deck 11 is powered by hydraulic motor 11M which is not shown in FIGS. 1 and 2, but is shown schematically in FIG. 7. Since further details of lumber deck 11 and unscrambler 12 may be found in the above-mentioned U.S. Pat. Nos. 3,204,753 and 4,054,211 and in the above-mentioned copending application Ser. No. 079,473 now U.S. Pat. No. 4,310,274, it is believed that the foregoing explanation will be sufficient for the purpose of understanding the present invention which is primarily concerned with improvements in the apparatus associated with the pivotal stacker arm assembly 13 and associated stick holders.

As best seen in FIG. 2, pivotal stacker arm assembly 13 comprises four cantilevered arms 40 which pivot on drive shaft 23 and extend in a direction transverse to the longitudinal axes of boards 15. Connecting bars 41, 42, 43 tie arms 40 together enabling the four arms 40 to pivot together as an assembly on shaft 23. Another bar 44 extends across the free ends of arms 40 and is integrally secured thereto. A bracket 45 is secured to the bottom of bar 41 and a similar bracket 46 is secured to the bottom of bar 43. Stationary frame members 50, 51 extend outwardly from the base of the frame of horizontal deck 20 and are secured to uprights 52, 53 and connecting member 54 to complete the stationary frame structure residing below the four pivotal arms 40. A bracket 55 is secured to stationary frame member 50 and a second bracket 56, now shown, is secured to stationary frame member 51.

Pivoting of the stacker assembly 13 is achieved by means of a pair of hydraulic cylinders 60, 61. Hydraulic cylinder 60 is pivotally secured to bracket 55 and hydraulic cylinder 61 is pivotally secured to bracket 56 of stationary frame members 50, 51, respectively. Piston rod 62 of cylinder 60 is pivotally secured at its free end to bracket 45 and piston rod 63 of cylinder 61 is pivotally secured at its free end to bracket 46. Appropriate supply and return lines and other hydraulic elements, shown in FIG. 7 only, extend from the hydraulic cylinders 60, 61 to a hydraulic fluid reservoir 64 and a hydraulic pump 65. Operation of cylinders 60, 61 and their respective piston rods 62, 63 thus causes pivotal stacker assembly 13 to be raised or to be lowered as needed in the stacking operation and, in its lowermost position, to rest on stationary frame member 54.

Four arm extensions 70 are secured to bar 44 and extend outwardly therefrom to form extensions of arms 40. Sprockets 72 are fixedly mounted on shaft 71 which passes through and is rotatably mounted in the U-shaped outer end portions of extensions 70. Four mating sprockets 73 are rotatably and independently mounted on shaft 23 adjacent the respective pivoted ends of stacker arms 40. A set of four chains 74 connect the pairs of sprockets 72, 73 and cause the respective chain-sprocket assemblies to rotate together.

Figure 5:
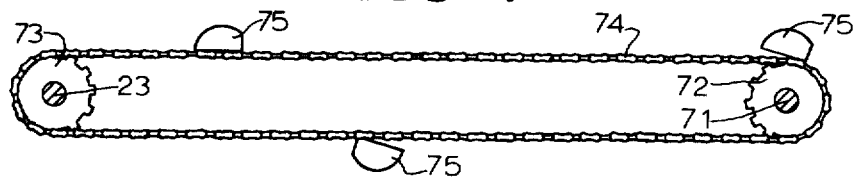
FIG. 5 is a side elevation view of one of the course advancing conveyor chains and associated disc members.

The chains provide means for both conveying boards along arms 40 and suplying sufficient force to the individual boards of the courses to propel the courses of boards onto the stack. For this purpose, each chain 74 is provided with three pusher discs 75 secured to the respective chains 74 in the manner best illustrated in FIG. 5. The function and operation of pusher discs 75 are later described in connection with the mechanisms which enable one course of boards to be built up on arms 40 while another course of boards is held ready for discharge proximate the discharge end.

Pivotal assembly 13 includes a plurality of course forming bars 47 with one such bar running parallel to and beside each chain 74. The function of the course forming bars 47 is to support the boards as they are being pushed along assembly 13. Thus, the upper surface of bars 47 is somewhat higher than chains 74 so that the boards slide on the bars, not the chains. As explained in more detail below, the pusher disc members 75 carried by chains 74 engage the trailing boards of the courses supported on assembly 13 to advance them forward. It can be seen that assembly 13 provides a board receiving end at shaft 23 and a board discharge end at shaft 71.

The drive system for chains 74 of pivotal assembly 13 is as follows, with primary reference being made to FIGS. 2 and 3. Sprockets 72, which are mounted on shaft 71, are utilized to drive chains 74. Shaft 71 is in turn driven by a sprocket 85 secured thereto and engaging drive chain 86. Chain 86 is in turn driven by a sprocket 87 mounted on the shaft 88 of a hydraulic motor 13M. Motor 13M is mounted on bracket 90 which is secured to bar 44. Motor 13M receives its fluid supply from previously mentioned reservoir 64. Operation of motor 13M drives sprocket 87 through shaft 88, which in turn drives sprocket 85 through chain 86. Rotation of sprocket 85 rotates shaft 71 and in turn drives sprockets 72. Chains 74 and the pusher disc 75 mounted thereon are driven by sprockets 72.

Chains 74 and the previously mentioned chains 18 are thus driven independent of each other by reason of sprockets 26 which drive chains 18 being fixedly secured to shaft 23, whereas sprockets 73 which drive chains 74 are rotatable about shaft 23. This structure facilitates the attaining of one of the advantages of the present invention, namely, the ability to build up a reserve course of boards while holding a primary course ready for discharge. The stacker base assembly 13 and associated conveyor define a pivotal conveyor.

Figure 3:
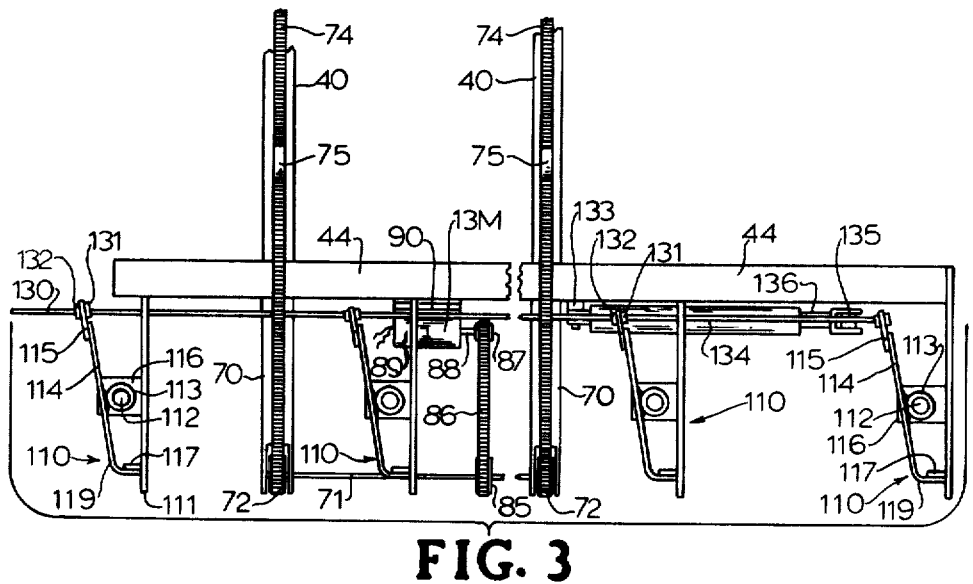
FIG. 3 is a fragmentary plan view of several of the stick holders, the stick holder activating cylinder and linkage and one of the course advancing and discharging conveyor chain and disc arrangements for pushing the boards off the conveyor. The holders are illustrated in a closed position but without sticks.
Figure 4:
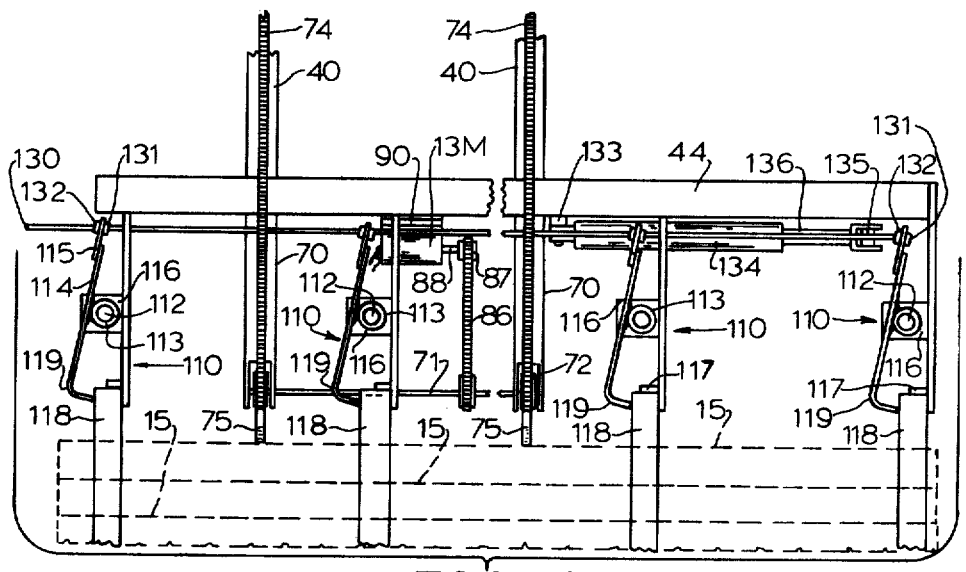
FIG. 4 is a view similar to that of FIG. 3 but illustrating the stick holders holding sticks in a course receiving position.

Turning now to a description of the stick holder assembly of the invention, best illustrated in FIGS. 2-4, nine stick holders 110 are employed in the illustrated embodiment. Stick holders 110 include fixed arm members 111, pivot pins 112, pivot sleeves 113, pivot arms 114 and angular extensions 115. Arm members 111 are rigidly secured to bar 44 and extend outwardly therefrom. A mounting plate 116 extends from the bottom of each of members 111 and mount respective vertical pivot pins 112. Pivotal arms 114 are secured to sleeves 113 which mount and pivot on the respective pins 112.

Stop blocks 117 serve to limit the inward movement of spacing sticks 118 into stick holders 110. Sticks 118 are adapted to be grasped by the bent ends 119 as illustrated in FIG. 4 during the making up of a layer of boards and, when not in service, the bent ends 119 are adapted to abut against the inside wall of fixed arm members 111 as illustrated in FIG. 3.

Pivoting of arms 114 and the resulting clamping and unclamping of sticks 118 is accomplished by movement of an elongate rod 130 which runs substantially the length of the discharge end of the pivotal assembly 13. Rod 130 extends through each of the respective angular extensions 115 on arms 114. Each angular extension 115 is maintained in operative position on rod 130 by a respective pair of washers 131, 132 rigidly secured to rod 130 on either side of each respective extension 115. A bracket 133 is rigidly secured to bar 44 and extends downward therefrom and mounts pivotally thereon at its lower end a double acting hydraulic cylinder 134 for reciprocating rod 130. For this purpose, piston rod 135 of cylinder 134 is pivotally secured at its free end to a bracket 135 secured to and extending downwardly from rod 130. Thus, actuation of the double acting cylinder 134 enables rod 130 to be moved back and forth, thereby causing stick clamping arms 114 to move between clamping and release positions. Appropriate supply and return lines and controls, shown in FIG. 7 only, extend from cylinder 134 to reservoir 64 and pump 65 for controlling cylinder 134.

The hydraulic circuit will now be described with reference to FIG. 7. Circuit 200 includes an electric motor 202 powered through switch 204 by an appropriate power sorce 206. Motor 202 powers main hydraulic pump 65 which, in a preferred embodiment, is a variable displacement, pressure-compensated, piston pump with a drain oil cooler 210. Reservoir 64 is preferably an open reservoir. Filtration is provided on the return flow to the reservoir by a filter 214. A strainer 216 is provided in the supply line to pump 65.

Figure 6:
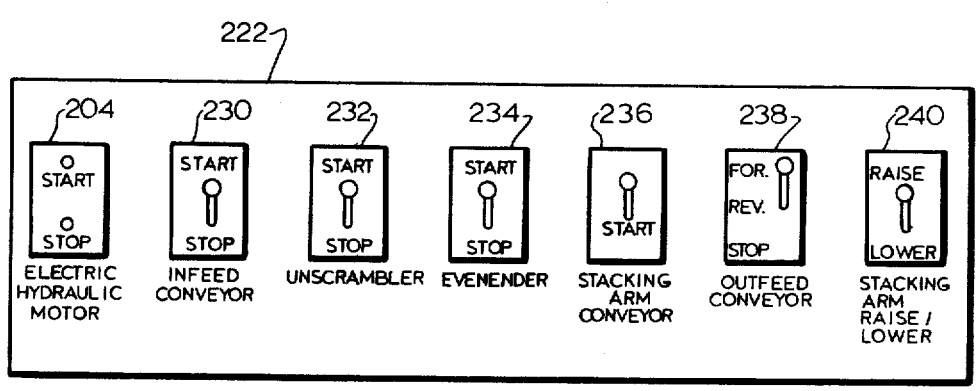
FIG. 6 is a view of the operator control panel.

Oil is supplied via line 220 to a stacked, seven-station control panel 222 which includes the electric motor switch 204 and six hydraulic valves 230, 232, 234, 236, 238, 240. Each hydraulic valve is operable by a manual hydraulic control lever as shown in FIGS. 6 and 7.

Infeed conveyor valve 230 is operable to control the infeed conveyor motor 11M. A pressure compensated flow control 244 assures consistent flow to motor 11M for constant speed operation.

Unscrambler valve 232 controls the operation of unscrambler motor 12M with the supply line including a pressure compensated flow control 246.

Evenender valve 234 controls the operation of evenender motor 30M with uniform operation of the motor being assured by a pair of restrictor/check valve assemblies 248, 250.

Stacking arm conveyor valve 236 control the stacking arm conveyor motor 13M. An automatic interlock is provided so that the stick holders 110 are automatically moved to their stick clamping positions before the stacking arm conveyor motor 13M is activated. Means for automatically placing the stick holders in the clamped position comprises a sequence valve 252 which serves to direct fluid to stick holder actuating cyclinder 134 via line 254 prior to the actuation of motor 13M. Thus, the stick holders are automatically placed in the clamping position before fluid is directed to motor 13M for driving of the stacking arm conveyor. When the stacking arm conveyor is deactivated, cylinder 134 is vented. This convenience and safety feature assures that the spacing sticks will be clamped by the stick holders 110 prior to movement of the stacking arm conveyor and that the positive clamping action will be terminated when the conveyor is deactivated.

As shown in FIG. 7, stacking arm conveyor valve 236 is designed to actuate the stacking arm conveyor upon the operator's engagement of the associated control lever. However, unlike the previously described hydraulic valves 230, 232 and 234, the stacking arm conveyor valve 236 is automatically closed to deactivate motor 13M when the conveyor has moved a sufficient distance to propel the primary course of lumber onto the lumber stack and simultaneously convey the just formed secondary course to the primary course position. This means for sensing the completion of the desired motion of the stacking arm conveyor may comprise a mechanical trip lever mounted at any selected point along the conveyor path, for example, trip lever 100 shown in FIG. 1. The trip lever may be connected to a wire in a sheath (not shown) which is in turn directed to valve 236. This mechanical action delivered to valve 236 may be used to release a detent-holding spring (not shown) of the valve, thereby closing the valve and deactivating motor 13M. While not illustrated, this function could be performed electrically by use of a microswitch and solenoid arrangement.

Outfeed conveyor valve 238 controls outfeed conveyor motor 14M (shown only in FIG. 7) for forward or reverse drive. A shuttle valve 266 and restrictor 268 require that fluid must be supplied via line 270 to cylinder 134 to positively move the stick holders 110 to their release position prior to supplying fluid to outfeed conveyor motor 14M.

Stacking arm raise/lower valve 240 is operable to selectively raise and lower the pivotal stacking arm via cylinders 60, 61. By the illustrated circuitry, particularly shuttle valves 266 and 267, the stick holders 110 must be moved to their release position by supplying oil through line 270 to cylinder 134 before the stacking arm may be raised or lowered. Uniform operation of cylinders 60, 61 is achieved by restrictor/check valve assemblies 272, 274, 276. After raising or lowering of the stacking arm, it is desirable that fluid not leak from cylinders 60, 61; therefore, a lock 280 is provided to maintain the cylinders in the desired position.

In operation, first a bulk supply of boards 15 is placed on deck 11. The infeed conveyor of lumber deck 11 is then activated to deposit the boards into the V-shaped portion of unscrambler 12. The unscrambler may then be activated so that individual boards are removed from the V-shaped portion by lugs 19 and conveyed in spaced-apart relation along deck 20 to the deck edge portion 21. Prior to the first boards reaching deck 20 it is desirable that evenender mechanism 30 be actuated to provide an even end to one end of the boards by means of rollers 33 and evenender wall 34.

Assuming the operaion has started with the formation of a first course of a new stack of lumber, the discharge end of the pivotal stacker arm assembly 13 will be somewhat lower than the position shown in dashed lines in FIG. 1. Boards reaching the end portion 21 of deck 20 leave chains 18 and are individually deposited on course forming bars 47 whose upper edge support surfaces reside slightly above the top side of chains 74. Boards 15 are pushed forward along course forming bars 47 until the desired number of boards has accumulated to form a course of boards in the reserve position. At this time, the control lever of valve 236 is moved to drive the stacking arm conveyor chains 74. Rotation of chains 74 will cause pusher discs 75 to contact the trailing edge of the course of boards in the reserve position residing on the course forming bars 47 and move the course forward to the primary course position. The drive of chains 74 is indexed so that chains 74 move forward by a distance equal to the distance between the reserve and primary course positions. The means for indexing the chains 74 comprises trip lever 100 and the associated structure that transfers the mechanical action caused by tripping of lever 100 to valve 236, thereby automatically closing valve 236 and stopping the drive of chains 74 through motor 13M.

Following the transfer of the first-formed course from the reserve position to the primary position, a second course of boards is formed at the reserve position in the manner previously described. With courses located at both the reserve and primary positions, the apparatus is ready to discharge a course to the stacker base 14. Since it is not necessary to place stacking sticks below the first course on the stacker base, valve 236 is now employed to index chains 74, thereby propelling the primary course onto the stacker base and conveying the secondary course to the primary position.

Next, valve 240 is employed to raise the end of the pivotal stacker base assembly 13 to the level of the second course to be formed on the stacker base. Then a new course is formed at the secondary position. Before propelling a second course onto the stacker base, the end portions of a selected number of stacking sticks are placed between the arms 111, 114 of the stick holders 110. With the sticks in place, valve 236 is employed so that the stick holders are automatically actuated by the described hydraulic circuitry to close and grip the sticks prior to the push-on drive of the primary course onto the stacker base. Thus, a second course is formed on the stacker base with the stacking sticks serving, first, as runners for the boards while they are being pushed onto the stacker base and, second, as spacers between the courses.

The stacking of spaced courses on stacker base 14 continues until the desired number of courses are formed. It will be appreciated that by the previously described hydraulic circuitry, the stick holders are automatically moved between open and closed positions during the stacking operation as a safety feature are to facilitate the fast and efficient operation of the apparatus.

After the last course is in place on the stack, valve 238 is employed to drive the outfeed conveyor and thereby convey the completed stack from the stacker base. One advantage of the apparatus of the invention is that during the conveying of the complete stack by the outfeed conveyor, the operator may be utilizing this time to move the reserve course still on the stacker arm assembly to the primary position and form a new course in the reserve position. Thus, when the stacker arm is lowered to start a new stack, both primary and reserve courses may be in place, and the first course of the new stack may be immediately pushed onto the stacker base without delay. It has been found that in normal use of the apparatus of the invention, the end of the pivotal stacker arm assembly 13 may be lowered at the completion of a stack to the position for starting a new stack in approximately ten seconds. With the primary course already in place, the first course of the next stack can be put into position immediately. Thus, with a typical time period of six seconds being required to push the course from the primary position to the stacker base, the first course of a new stack can be formed within approximately sixteen seconds of the completion of the previous stack.

It will be appreciated that, depending upon the width of the courses being formed and the length of the stacker arms, more than one reserve course may be "stored" on the pivotal assembly 12. An advantage of the apparatus of the invention, whether used to define a primary position and only one reserve position or a primary position and multiple reserve positions, is that the length of the pivotal assembly 13 which is necessary to provide the desired range of motion for forming the stacks is used to "store" reserve courses. The reserve courses give the operator considerable latitude in choosing his operational sequence since he can build up reserve courses as he wishes independent of other apparatus functions.

It will be appreciated that the distance that the chains 74 index each time the stacking arm conveyor valve 236 is employed may be readily varied by mounting the pusher discs 75 at any desired spaced intervals on the chains.

While the primary utility of the invention apparatus is achieved where the stacker arm assembly has a length from its receiving end to its discharge end of at least twice the width of the courses to be formed thereon, it will be appreciated that in stacking relatively wide courses of lumber the operator may choose not to employ both primary and reserve courses, and he may select the intervals between the pusher discs accordingly.

Finally, it will be appreciated that the functions achieved by the hydraulic valves in selectively energizing the respective hydraulic motors and cylinders may be achieved electrically by appropriate electrical switches controlling solenoid valves.

While the present invention has been disclosed primarily with reference to a preferred embodiment, it will be appreciated that modifications may be made without departing from the true spirit and scope of the invention.

I claim:

1. A stick holder assembly for use in holding the marginal end portions of a selected number of stacking sticks in a push-on formation of a stack of lumber wherein the relative vertical positioning of the discharge end of a push-on conveyor and the base of a stack of lumber being formed is indexed before formation of each new course on the stack, said stick holder assembly including:
   a plurality of spaced stick holders positioned along the discharge end of a push-on conveyor, at least some of said stick holders including opposed elements alternately actuatable between a closed position for holding the marginal end portion of a stacking stick therebetween and an open position for releasing such stick, and said stick holder assembly further including means for automatically actuating the stick holders to open for stick release at the initiation of the indexing of the relative vertical positioning of the conveyor discharge end to the stack base before the indexing begins and to close for stick holding at the initiation of push-on drive of the lumber onto the deck but before the drive begins, said indexing of the relative positioning of the discharge end to the stack base and the conveying of boards from the conveyor to form the next course of the stack being accomplished by hydraulic drive devices and said means for automatically actuating the stick holders comprising:
   a double acting cylinder for positively opening and closing the stick holders;
   hydraulic circuit elements that upon actuation of the push-on drive, first directs fluid to a first end of the cylinder to close the stick holders before directing fluid to the push-on drive; and
   hydraulic circuit elements that, upon indexing of the relative vertical positioning of the conveyor discharge end and the stack base, first directs fluid to a second end of the cylinder to open the stick holders before directing fluid to the hydraulic drive device that indexes said relative vertical positioning.

2. A stick holder assembly as claimed in claim 1 wherein said at least some of said stick holders include a pair of opposed arms, at least one arm of the pair being pivotable by operation of said actuating means into closed and open positions.

3. A lumber handling and stacking apparatus comprising:
   a substantially horizontal deck having means for receiving a bulk supply of boards and for conveying boards along a fixed plane and in a direction transverse to their longitudinal axes;
   a pivotal conveyor having its receiving end situated adjacent the discharge end of said horizontal deck and providing a pivotal plane of travel for said boards as a continuation of said deck plane and having means for receiving and conveying said boards in a spaced apart relation along said pivotal plane of travel and in a direction transverse to their longitudinal axes;

remotely controllable means for raising and lowering said pivotal conveyor for selective positioning of the pivotal plane thereof;

a plurality of laterally spaced, releasable stick holders corresponding in number to the desired number of stacking sticks used to separate layers in the stack of lumber, each said stick holder having means for closing the stick holder to releasably hold a marginal end portion of one of the uppermost stacking sticks during the formation of a layer of lumber in said stack enabling with the stacking stick so held resting upon the previously formed layer and being disposed substantially horizontally, thereby enabling the plurality of stacking sticks so held to serve as temporary runners for supporting and guiding the boards discharged from said pivotal conveyor and each stick holder further including means for opening the stick holder to release sticks so held upon completion of the formation of each layer whereby said pivotal conveyor may be moved upwardly to the level of the next layer to be formed;

remotely controllable actuating means mounted on said pivotal conveyor for opening and closing said releasable stick holders in unison, said actuating means including means for automatically actuating the stick holders for releasing the sticks at the initiation of each raising of the discharge end, but prior to the raising, and for gripping the sticks at the initiation of the propelling of each course of boards onto the stack, but before the propelling begins; and a stacker base assembly providing a horizontal conveyor located to receive the successive layers of lumber during the forming of the lumber stack and for moving the completed stack away from the discharge end of said pivotal conveyor to allow the formation of another successive stack.

* * * * *